US007861171B2

(12) United States Patent
Johanson et al.

(10) Patent No.: US 7,861,171 B2
(45) Date of Patent: Dec. 28, 2010

(54) POINTRIGHT BASED POINT-OF-PRESENCE SYSTEM AND ARCHITECTURE

(75) Inventors: Bradley E. Johanson, Palo Alto, CA (US); Andrew J. Milne, Palo Alto, CA (US)

(73) Assignee: Tidebreak, Inc., Palo Alto, CA (US)

( * ) Notice: Subject to any disclaimer, the term of this patent is extended or adjusted under 35 U.S.C. 154(b) by 127 days.

(21) Appl. No.: 11/345,609

(22) Filed: Jan. 31, 2006

(65) Prior Publication Data

US 2006/0195791 A1 Aug. 31, 2006

Related U.S. Application Data

(63) Continuation-in-part of application No. 10/821,685, filed on Apr. 8, 2004.

(60) Provisional application No. 60/649,247, filed on Feb. 1, 2005, provisional application No. 60/461,555, filed on Apr. 8, 2003.

(51) Int. Cl.
*G06F 3/00* (2006.01)

(52) U.S. Cl. ...................................................... 715/733

(58) Field of Classification Search .................. 715/733
See application file for complete search history.

(56) References Cited

U.S. PATENT DOCUMENTS 6,501,441 B1 * 12/2002 Ludtke et al. ................ 345/1.1
7,260,624 B2 * 8/2007 Sivertsen .................... 709/223
2003/0229900 A1 12/2003 Reisman
2004/0031058 A1 2/2004 Reisman
2004/0210846 A1 10/2004 Olsen ......................... 715/761

OTHER PUBLICATIONS

Kellogg S. Booth et al., "The 'Mighty Mouse' Multi-Screen Collaboration Tool," Oct. 2002, University of British Columbia.*
Hourcade, "Architecture and Implementation of a Java Package for Multiple Input Devices (MID)," May 1999.*
Hinckley, et al. "Stitching: Pen Gestures That Span Multiple Displays" (2003) http://patrickbaudisch.com/publications/2004-Hinckley-AVI04-Stitching.pdf.
"Synergy" (2006) http://synergy2.sourceforge.net/.
J. Rekimoto and M. Saitoh "Augmented surfaces: A spatially continuous work space for hybrid computing environments," Proceedings, ACM CHI '99, Pittsburgh, PA, May 15-20, 1999. Available at http://citeseer.ist.psu.edu/rekimoto99augmented.html.

* cited by examiner

*Primary Examiner*—William L Bashore
*Assistant Examiner*—Daniel Um
(74) *Attorney, Agent, or Firm*—Lumen Patent Firm

(57) ABSTRACT

An interactive workspace with multiple users and machines is characterized by an input redirection method whereby user-specific information is associated to the user input device that the user is controlling on one of the machines. The system allows the associated information to follow the user input device as it is redirected to control any of the other machines. Accordingly a point-of-presence is created for the user on the other machines, which includes the associated user-specific information. The associated user-specific information that was bound to the user input device to one of the machines can be transferred to where the user has a point-of-presence due to redirection of the user's input device. The user's input device and transferred user-specific information are independent from the: (i) actions performed and information specific to other users, and (ii) functionality of applications running on the other machines by the other users.

6 Claims, 1 Drawing Sheet

110-2
122-3-2
133
134
132
122-2
120-2
122-1
131
130
info
130
122-1-3
130'
135
info
138
136
137
122-3
110-1
120-1
130
info
150
110-3
120-3
100
140

POINTRIGHT BASED POINT-OF-PRESENCE SYSTEM AND ARCHITECTURE

CROSS-REFERENCE TO RELATED APPLICATIONS

This application is cross-referenced to and claims the benefit from U.S. Provisional Patent Application 60/649,247 filed Feb. 1, 2005, which is hereby incorporated by reference. This application is also a continuation-in-part of U.S. patent application Ser. No. 10/821,685 filed Apr. 8, 2004, which claims the benefit from U.S. Provisional Patent Application 60/461,555 filed Apr. 8, 2003.

FIELD OF THE INVENTION

The invention relates generally to interactive workspaces. More particularly, it relates to an improved system and method of input redirection across screens, displays, monitors, and the like driven by different machines and operating systems in a workspace and it relates mechanisms to provide users with customized means of interacting with the machines to which their input is being redirected.

BACKGROUND

PointRight is a user-friendly input redirection system that enables any user's keyboard and mouse to be used across multiple publicly displayed computers in a multi-user, multi-machine interactive environment. It employs a geometric model for mouse motion across screens and redirects input across multiple independent machines and operating systems. In other words, with PointRight, a user can use the mouse to easily move the cursor from machine to machine according to the topology of screens in the interactive environment. When a cursor reaches the edge of a screen, PointRight seemingly moves to the adjacent screen and keyboard control is simultaneously redirected to the appropriate machine. PointRight is described in detail by Johanson et al. in U.S. patent application Ser. No. 10/821,685 filed Apr. 8, 2004. The present invention further extends the architecture and functionality of PointRight to enhance its versatility for cross-device, cross-platform multi-user input redirection capabilities.

SUMMARY OF THE INVENTION

The present invention applies to an interactive workspace characterized by multiple users and multiple independent machines. Each machine is operatively coupled to a network and may be operatively coupled to user input devices (typically keyboard and/or mouse). An input redirection method, preferably according to PointRight, is used to allow each one of the user input devices to redirect its input across the multiple independent machines in the interactive workspace. The invention is characterized by associating user-specific information to the user input device that the user is controlling on one of the multiple independent machines. The system allows the associated information to follow the user input device as its' input is redirected to control any of the other multiple independent machines.

Accordingly a point-of-presence is created for the user on any of the multiple independent machines which they control. The point-of-presence includes the associated user-specific information. Furthermore, a key aspect is that the point-of-presence is independent from any other point-of-presence for an input device being redirected by another user onto a different one of the multiple independent machines or even onto the same machine. In addition, the point-of-presence is independent from any state inherently associated with one of the multiple independent machines to which the user is redirecting their input device.

The associated user-specific information that was bound to the user input device on one of the multiple independent machines can be transferred to where that user has a point-of-presence due to redirection of the user's input device. Several examples of information that can be transferred are provided herein. For example, user-specific information that could be associated and transferred includes data, user-preferences, one or more URLs, one or more images, one or more objects, one or more application windows, one or more files or one or more folders. In an alternate embodiment of the invention, information can also be transferred from a remote machine into the user-specific information.

One of key aspects of the invention is that the user's input device redirection and the transferred user-specific information are independent from the actions performed and information of other users in the interactive workspace. Another key aspect of the invention is that the user's input device redirection and the transferred user-specific information can be independent from the functionality and state of applications running on any of the other multiple independent machines and being controlled by any of the other users.

Yet another key aspect of the invention is that the associated user-specific information could be maintained in a personal user-specific buffer associated with the user input device thus making the personal user-specific buffer accessible to the user on any of the independent multiple machines independent of the physical location of the user or physical location of the user's input device.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
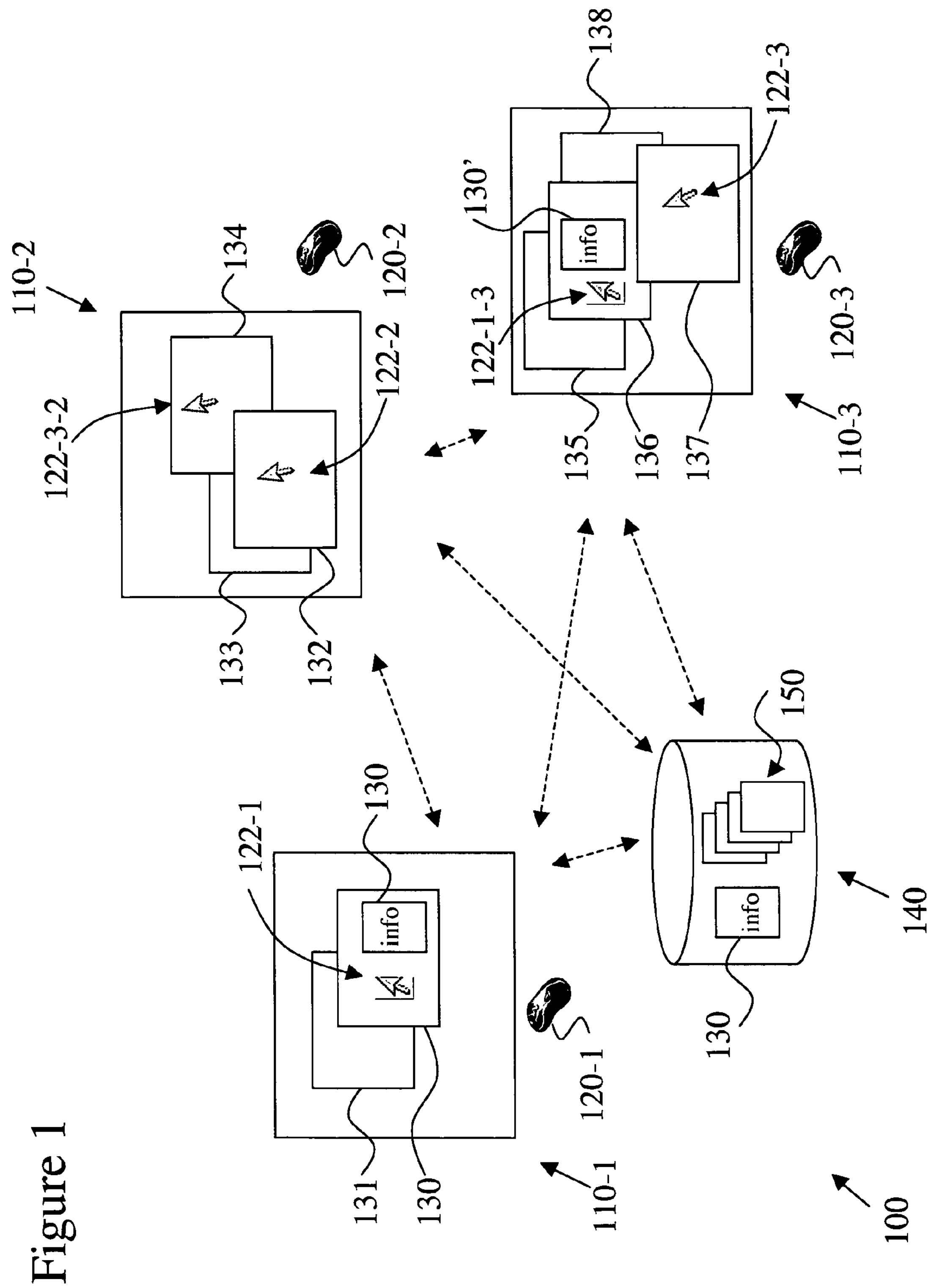
FIG. 1 shows an example of an interactive workspace according to the present invention.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

FIG. 1 shows an interactive workspace 100 characterized by multiple users and multiple independent machines 110-1, 110-2 and 110-3. Each machine 110-1, 110-2 and 110-3 is operatively coupled to a user input device 120-1, 120-2 and 120-3, e.g. a mouse, a keyboard, a trackpad, a tablet, or the like, respectively. The machines are further operatively coupled within a network, which is indicated by bi-directional arrows. Each input device controls for example a pointer 122-1, 122-2 and 122-3 on their respective machines. On each machine, a user could be working with application(s), object(s), window(s), files, folder(s), or the like, which are generically indicated by 131-138.

An input redirection method according to the teachings of the PointRight system is used for controlling each one of the user input devices across the multiple independent machines in the interactive workspace. PointRight is described by Johanson et al. in U.S. patent application Ser. No. 10/821,685 filed Apr. 8, 2004 and is hereby incorporated by reference for all that it discloses.

In the example of FIG. 1, pointer 122-1 of input device 120-1 is redirected to machine 110-3, while pointer 122-3 of input device 120-3 is redirected to machine 110-2. In the spirit of PointRight, this means that control from input device 120-1 has moved from machine 110-1 to machine 110-3 as indicated by pointer presence 122-1-3. Likewise, control from input device 120-3 has moved from machine 110-3 to machine 110-2 as indicated by pointer presence 122-3-2.

Some specific functionality and key features of PointRight are:

- Each machine in the interactive workspace 100 that allows redirection of its keyboard/mouse through PointRight stores a model of the topology of the space. This topology may be unique per machine or based on a subscription to a common model used by all PointRight instances in a room.
- Using the model, the mouse movement by the user and other heuristics the machine with the mouse and keyboard determines to which remote machine its mouse and keyboard input should be currently redirected. The same applies to all types of input devices.
- PointRight has a sense of one user per cursor being controlled in the space.
- PointRight is tracking with which remote machine the user is trying to interact.
- PointRight stands between the user and the remote machine so it can transform the users input (e.g., it could intercept a keystroke and interpret it as a PointRight command or a workspace wide event instead of sending it to the current remote machine).

The present invention extends PointRight's functionality is several significant ways. The extension starts with associating user-specific information to the input device that the user is controlling on one of the multiple independent machines. For example, user-specific information 130 is associated with pointer 122-1 of input device 120-1. User-specific information could be data, user-preferences, one or more URLs, one or more images, one or more objects, one or more application windows, one or more files, one or more folders, or the like.

The system further allows associated information 130 to follow the user input device as it is redirected to control any of the other multiple independent machines. Herewith, a point-of-presence is created for the user on any of the multiple independent machines including the associated user-specific information. An example is the point-of-presence of input device 120-1-3 with associated information 130 on machine 110-3. It is important to note that such a point-of-presence is independent from any other point-of-presence for an input device being redirected by another user from a different one of the multiple independent machines. Furthermore, the point-of-presence can be independent from any state inherently associated with one of the multiple independent machines to which the user is redirecting their input device.

The point-of-presence information could be created or changed in several ways. For example, the user-specific information (data) can be static long-lived things like the user's preference for the "look" of their remote cursor. It could also be dynamic data that gets redirected from their local machine, such as redirecting the graphic content of a live window on their machine for display on a remote machine. Furthermore, it could be dynamic information that is read/written from any machine they control, i.e. they can copy or paste on any machine. Copying on a remote machine causes data to be written to their state from information on the remote machine, while pasting causes information to be read from their state and transferred to the remote machine.

The associated user-specific information that was bound to the user input device could be transferred to one of the multiple independent machines where the user has their point-of-presence due to redirection of the user's input device. For example, associated user-specific information 130 can be transferred to machine 110-3 as indicated by 130'. This information could be transferred automatically as soon as the input device is redirected, or it could be transferred only as the actions of the user on the remote machine require access to the information. In an alternate embodiment of the invention, information can also be transferred from a remote machine into the user-specific information.

To indicate to other users that a remote user has established a point-of-presence an imitation cursor could be displayed during the transfer phase on any of the multiple independent machines other than the machine used by the user of the input device.

Feedback could also be provided to the user with the point-of-presence on any of the multiple independent machines other than the machine used by the user of the input device.

The user's input device (e.g. 122-1-3) and the transferred user-specific information (130') are independent from the actions performed and information specific to other users in the interactive workspace. Furthermore, the user's input device (e.g. 122-1-3) and the transferred user-specific information (130') are independent from the functionality of applications running on any of the other multiple independent machines by any of the other users.

Maintaining the associated user-specific information in a personal user-specific buffer 140 allows each user to access its user-specific information (e.g. 130 and 150) across each one of the multiple machines independent from the physical location of the user or independent from the physical location of the user's input device. This buffer could be maintained in many different ways, including, but not limited to, on the machine from which the user is redirecting, on some other network accessible dedicated machine, or even in a distributed fashion across the multiple independent machines in the interactive workspace.

Some exemplary aspects of the point-of-presence are:

- Each user could have their own copy/paste buffer associated with their cursor which does not interfere with the action of any other users. In other words, two or more users can simultaneously be copying and pasting without overwriting the information copied by another party or accidentally pasting information copied by another party. Copy or paste actions are always applied on the screen to which the user has currently redirected cursor control.
- Users can use their cursor to drag files, URLs, objects (e.g. images), folder collections, and other forms of information between machines independently of other users.
- Users can drag live application windows between machines. The application remains active and connected to the same information. In one embodiment, this could be accomplished with VNC-type sharing. In other embodiments, multiple "slave" application instances might be allowed to run in viewers.
- Users could have customizations that will apply only when they are using the cursor on a given machine. This capability is advantageous in multiple cursor environments because it allows the underlying PointRight system to automatically differentiate the cursors if there appears to be a conflict. While there are many possible customizations, here are a couple examples:

They could have a custom cursor that uniquely identifies them and/or has particular properties they designate.

Context menus can be automatically updated in a user specific way when the user is interacting with a remote machine to provide options to email content to their account. (Currently, some systems support emailing via a context menu, but the email is always addressed as being from the primary user of the machine.)

In summary, the point-of-presence system and method according to the present invention provides a new functionality and adds many useful features to the PointRight system. Preferably, the present invention is implemented with the PointRight system, which already tracks each user's cursor independently.

Along with the model of the screen layout and the current cursor location, the system maintains local state based on the current user of the local mouse and keyboard, their recent activities, and their preferences. Thus, when an action is triggered through the system on the machine to which the local keyboard and mouse are being redirected, the system can modify the functioning of that action according to the local state. One example of this is copy/paste, where the system can intercept commands to paste such that the paste still occurs on the machine to which control is being redirected, but the pasted information comes from a personal paste buffer for the user controlling the physical keyboard and mouse that are being redirected, rather than coming from the paste buffer maintained on the machine to which control is being redirected.

With this invention, the user's cursor which they are controlling on publicly displayed machines in the interactive workspace becomes their point-of-presence in the room, allowing them to bring all their digital state and preferences with them to any machine which they are currently controlling. The next section details several specific mechanisms that take advantage of this invention along with their implementations. As one skilled in the art will appreciate, the point-of-presence functionality could be used to support many other useful mechanisms.

Drag-and-Drop

Users are accustomed to being able to drag-and-drop items on their desktop to trigger certain actions. For example, files icons can be dragged from one folder and dropped in another to trigger that file to be copied or moved between the two folders. Other actions are also possible such as dragging a word processing document into a window of the word processor to trigger it to be opened.

Since the system allows the cursor to travel seamlessly between machines displaying on adjacent screens, users expect to be able to perform drag-and-drop actions across the machines just as they would on a single machine. In fact, in many circumstances, users may not even realize that the machines are separate and it becomes perplexing when actions like drag-and-drop don't work correctly. The drag-and-drop mechanism which can be implemented using this invention fixes this problem.

With drag-and-drop implemented using this invention, any user can drag an item to any machine to which they can also move their cursor to redirect control. So, a file can be transferred from a folder on one machine to the desktop on another machine, for example. The system also works across different platforms, so a file could be transferred from a Windows® machine and dropped on a Macintosh® OS X machine. Any other items that a user might drag-and-drop in a local machine environment can also potentially be transferred across machine boundaries before being dropped.

In some cases, implementation details may make it impossible to support a drag-and-drop operation across machines, in which case the system would prevent the user from moving their cursor across a screen boundary if a drag-and-drop action was in progress or would otherwise handle the condition. The user could be notified of why they can't drag-and-drop to the new machine by a small flash, a sound, a transient text-warning message displayed on the screen or some other mechanism.

Since the system will maintain a separate state of what is being dragged by each user, multiple users dragging onto or across the same screen will not be an issue. Each user can drag their own content and when they release the appropriate drop action will occur.

Implementation

Each client can track whenever a user causes their mouse to transition to a new machine and take note of whether a drag is taking place when the transition is made. On the remote machine an 'imitation' cursor will be shown if a drag operation is still in progress (this allows other users or users that are local on the remote machine to perform actions during the drag without having their button state corrupted).

When the user drops by releasing the mouse button, the system on the remote machine will transfer the contents of the drag buffer to the local machine and then send a 'drag-release' message to the OS on that machine, which will then treat the drag-and-drop operation as if it had been local.

For each type of content that can be dragged, the system will have to have special code to make sure that the drop appears as if it were local. For example, if a file is being dragged it may have to pre-transfer the file to the machine so that the OS can do a local-to-local drag operation. For drag-and-drop operations that take place between machines with different operating systems various types of transformations to the data may need to take place, including translating drag-buffer structures, modifying byte-ordering, or changing text formats.

Live Windows

This feature is actually a sub-type of the drag-and-drop mechanism mentioned above which allows users to drag certain windows between different publicly displayed machines. Many users have already used machines with multiple-monitors and a virtual desktop. In these systems, windows can be dragged between different screens or even span different screens since the OS is actually writing to a single frame buffer, which is being rasterized to multiple video signals going to different monitors. On account of this, users expect that they can drag windows from their laptops to publicly visible screens, or between the different publicly visible screens.

The 'live window' mechanism of the system allows users to drag select windows between machines. When the user drags the window to a new machine an outline of the window is shown. When the outline is dropped, the window stays in its original location on the source machine and a 'live' copy of the window is created on the machine where the outline was dropped. This copy shows a pixel accurate representation of the original window, which is continuously updated as long as the original window exists and the 'live' copy is kept open.

Users may interact with the copy using keyboard and mouse and their inputs will be redirected to the original window.

The "live" copy differs in some ways from the original window. It is labeled or highlighted in some way to ensure that users recognize that it is not the original. Closing or minimizing the window will only close or minimize the copy and not the original.

Also, at times the original may be hidden or inactive such that it is not possible to get updates of its graphical state or allow input to the program through that window. In these cases, the "live" copies will "gray out" or use some other mechanism to indicate they are no longer live. The copies will continue to display the last known graphical state of the original, but will no longer allow user input. When the original is closed, all "live" copies will go inactive in the above stated way, but with additional indicators to show that this is a final state and that the windows will not become active again.

Certain windows will not be candidates for moving for various reasons (for example, they may use special video overlay or other local machine graphics extensions that cannot be redirected efficiently or at all, or may be windows for file folders that don't make sense to show on other machines). In this case, the user will be prevented from dragging the window off the screen and an appropriate error will be signaled to the user or the condition will be handled in some other appropriate way.

Implementation

When a user reaches a screen boundary and is dragging a window, the system will detect such a user movement/action and will correspondingly cause an outline of the window to be dragged on other screens until the user releases the mouse button. At that point, a window is created and a remote desktop viewing application is launched which mirrors the pixels of the remote window and redirects mouse and keyboard input back to that window. The mirroring application also handles annotating the window to make sure people know it is being mirrored, and annotating it to appear inactive in cases where the remote window is closed or unavailable for interaction.

Copy/Paste

Users are used to copying some information, switching to another application or window and then pasting that information in the new location. These basic editing tools become problematic when multiple users are working across multiple machines. The first problem is that while the system allows users to move their cursors to new machines, the copy/paste buffer is still per machine so information copied on one machine can only be pasted on the same machine.

A known application called iClipboard and its variant "CrossPaste" attempted to address this problem. When running on a machine in an interactive workspace, that machine's copy/paste buffer is linked into the copy/paste buffer of every other machine in the workspace that is also running, say, CrossPaste. This allows a user to copy on one machine and paste on the other. Problems occur, however, when two users copy at about the same time. The second user to trigger the copy overwrites the information copied by the first, and when the first pastes his information the information copied by the second is pasted instead of his intended information.

The present invention solves this problem with a superior solution, i.e., by providing each user with their own copy/paste buffer that will work across different machines in the workspace. When a user performs a copy on a remote machine, the information is copied into the buffer for the user that triggered the copy. That user can then paste the copied information on the same machine or any other machine in the workspace. Since the copy/paste buffer is maintained per physical keyboard/mouse that is being redirected by PointRight, other users performing copy/paste operations will not interfere. The local copy/paste buffer on the machine is also maintained so users directly using a machine can also copy/paste without interference from other users.

Implementation

Since the existing PointRight invention by its nature must track all keyboard and mouse input, it can intercept all user triggered copy/paste commands. Thus, in the case of keyboard triggered copy/paste commands, the keystrokes for the copy/paste commands can be intercepted and used to trigger the special copy/paste mode. Note that different operating systems may have different keyboard shortcuts for the copy/paste commands, so the present system will have to intercept keystrokes based on the platform of the system to which control is being redirected (e.g., on the Windows® platform, copy is Ctrl-C and on the Macintosh® platform, it is Command-C).

For programmatically invoked copy/paste (for example, users triggering copy/paste from the 'Edit' menu or a context menu), the system has to monitor and intercept the copy/paste system events. In either case, if the command is a cut or a copy, the system must first "paste" from the system's copy/paste buffer into a temporary location to preserve the old clipboard. Then, the cut or copy command is performed like normal. The system then copies the new clipboard data into the user's personal clipboard. This can be done either by sending it back to the machine from which the user is redirecting the keyboard/mouse, or caching on the machine where the cut/copy took place. After that, the old clipboard is restored by programmatically "copying" the old clipboard content back into the copy/paste buffer.

When a paste is performed, the system must once again back up the clipboard on the system as with the cut/copy scenario described above. Then, the user's personal information is programmatically "copied" into the clipboard on the system (first having been transferred from the machine where the actual copied data is currently cached), and then a programmatic "paste" is executed. Finally, the backed up clipboard information is "copied" back to the copy/paste buffer on the machine. For many of the above-described mechanisms, a security system to allow some or all remote users to be locked out would be a useful extension (e.g. "I only want students to be able to copy and paste on the front screen where I'm teaching."—or similarly for dragging items, etc.).

In the cases where the user is not redirecting their mouse/keyboard but is actually on their local machine, the step of backing up the system clipboard can be eliminated since the system clipboard should match the POP clipboard of the local user.

Customization

Various customizations of how the system user interacts with remote machines can be handled by the point-of-presence functionality. For example, a user can select a unique cursor or cursor set which will automatically be set for them as they transition amongst the publicly visible screens. One user could choose red cursors, for example, to make it easier for them to track where they are and to allow other users in the space to be able to more easily tell who is currently controlling some public screen/machine. The system could also automatically select a unique cursor set for the user when they mouse off their system and a large copy of the selected cursor icon/representation would appear in the center of their "home" device as a reminder of what their cursor looks like in the space.

Another possible customization would be to introduce additional context menu items on a public screen based on the user currently controlling the mouse. So, for example, an 'Email me' choice could be added to the context menu for files in Windows so that when clicked it would send an email with that file as an attachment to the user controlling the cursor.

Customization will also provide for user's to put their cursor into different modes. The default mode is the standard redirect keyboard/pointer mode. Another mode will allow someone who is monitoring content to use their cursor as a marker to draw over the top of screen content without actually interacting with the screen content. These annotations could be ephemeral, disappearing after a brief period, or more permanent. The annotations could also be automatically captured and logged for later playback of what happened in the meeting.

Implementation

Much of the implementation would be specific to the type of customization that was desired. This section will describe the implementation for the two examples described above.

For the cursor customization, the user would be able to select which cursor set they wish to use. As the cursor is switched to a new screen, the client on that machine would change the active cursor or cursor set to match that of the user redirecting their keyboard and mouse. This would work in a similar fashion for the automatically selected unique cursor set, with the exception that the step where the user selects their cursor set would be eliminated.

For the context menu customization, the system would programmatically add an item to the context menu before transmitting the context menu key or right click that would trigger the context menu. Once the menu was updated based on the settings of the user redirecting their keyboard and mouse the command to trigger the context menu would be triggered as normal. The system would monitor system events to determine when the context menu went away and then change it back to its' original configuration.

As one skilled in the art will appreciate, most digital computer systems can be programmed to implement the point-of-presence functionality and system disclosed herein. To the extent that a particular computer system configuration is so programmed, it becomes a digital computer system within the scope and spirit of the present invention. That is, once a digital computer system is programmed to perform particular functions pursuant to computer-executable instructions from program software that implements the POP point-of-presence functionality and system, it in effect becomes a special purpose computer particular to the present invention. The necessary programming-related techniques are well known to those skilled in the art and thus are not further described herein.

Computer programs implementing the present invention can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A method of establishing two or more independent and simultaneous points of presence on a machine, comprising the step of networking a plurality of independent machines, whereby each of said machines is connected by an input device, and whereby each of said input devices controls a pointer thereby creating a point input device combination, whereby two or more of said pointers each controlled by independent machines are capable of being displayed on one of said machines independently and simultaneously, whereby two or more of said input devices each controlled by independent machines are capable of controlling their respective pointers on one of said machines independently and simultaneously, whereby two or more of said pointers each controlled by independent machines are capable of independently and simultaneously associating user-specific information to their respective pointer input device combination, wherein said user-specific information comprises one or more files, one or more folders, one or more application windows, one or more images, a user-specific copy-paste buffer, or one or more user-specific application preferences, whereby said associated user-specific information of said two or more pointers is capable of being displayed or used on one of said machines independently and simultaneously, and whereby each of said pointers controlled by independent machines and with said associated user-specific information is capable of traveling independently and simultaneously from one or more of said machines to at least one other of said machines in said network of machines without affecting or interfering with the control and display of the other pointers, and without affecting or interfering with the other associated user-specific information.

2. The method as set forth in claim 1, further comprising maintaining said associated user-specific information in a personal user-specific buffer associated with said pointer input device combination and making said personal user-specific buffer accessible across said machines independently from the physical location of a user or physical location of said pointer.

3. The method as set forth in claim 1, further comprising displaying an imitation cursor on any of said machines other than the machine used by said pointer.

4. The method as set forth in claim 1, further comprising providing feedback to a user of said transferred user-specific information on any of said machines other than the machine used by said pointer.

5. The method as set forth in claim 1, wherein said two or more pointers are displayed on one of said machines, wherein each of said two or more pointers is displayed as a unique user-specific cursor.

6. The method as set forth in claim 1, wherein each of said pointers is associated with an independent copy/paste buffer.

* * * * *